Nov. 6, 1934.   H. B. HYAMS   1,979,833

MERCHANDISE DISPLAY DEVICE

Filed Jan. 11, 1932   4 Sheets-Sheet 1

Inventor
HERBERT B. HYAMS
By Paul, Paul & Moore
ATTORNEYS

Nov. 6, 1934.  H. B. HYAMS  1,979,833

MERCHANDISE DISPLAY DEVICE

Filed Jan. 11, 1932     4 Sheets-Sheet 2

Inventor
HERBERT B. HYAMS
By Paul, Paul Moore
ATTORNEYS

Nov. 6, 1934.    H. B. HYAMS    1,979,833
MERCHANDISE DISPLAY DEVICE
Filed Jan. 11, 1932    4 Sheets-Sheet 3
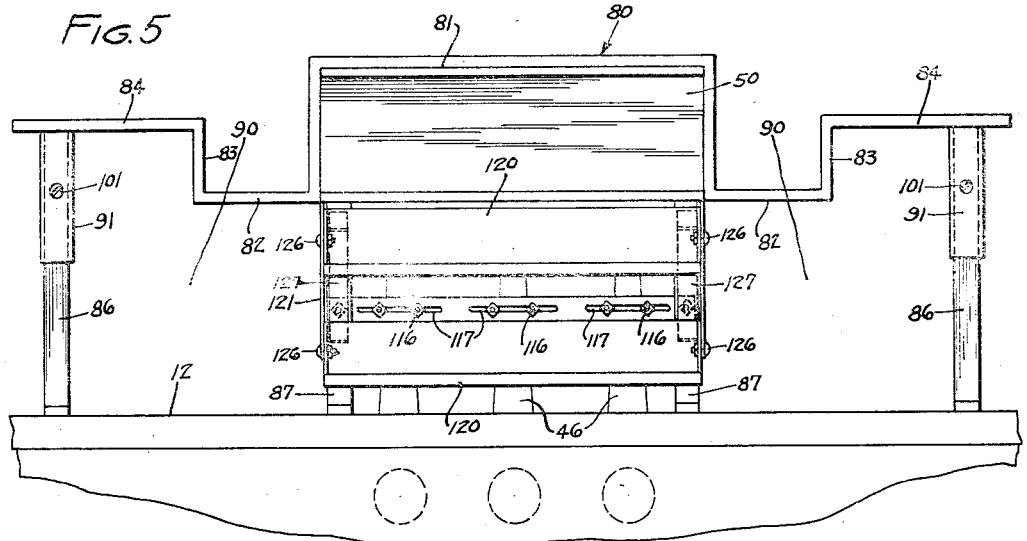
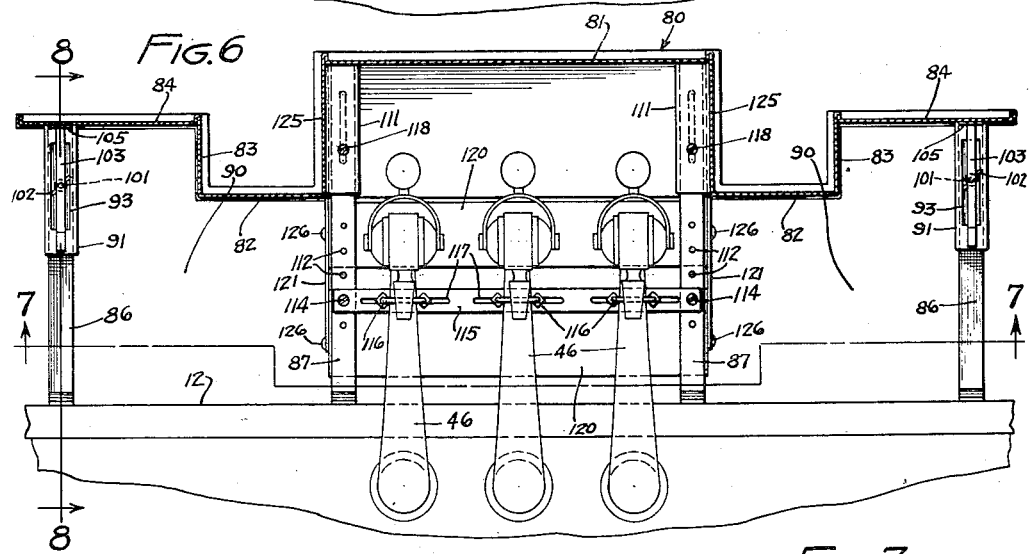
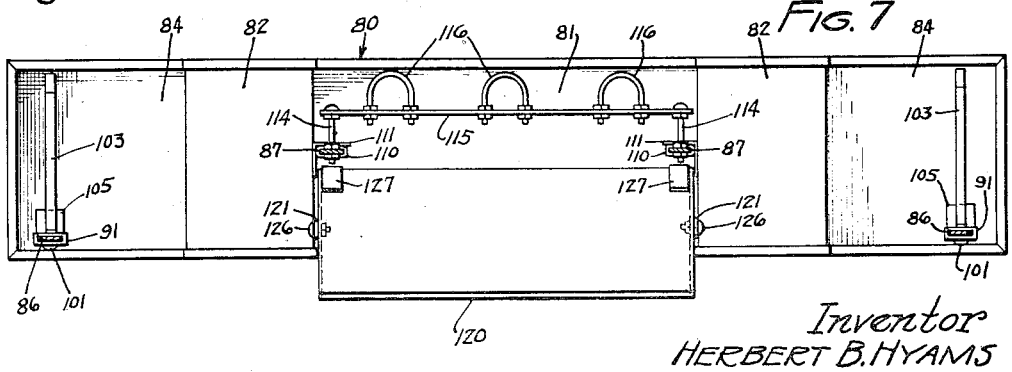
Inventor
HERBERT B. HYAMS
By Paul, Paul & Moore
ATTORNEYS Nov. 6, 1934.   H. B. HYAMS   1,979,833
MERCHANDISE DISPLAY DEVICE
Filed Jan. 11, 1932   4 Sheets-Sheet 4
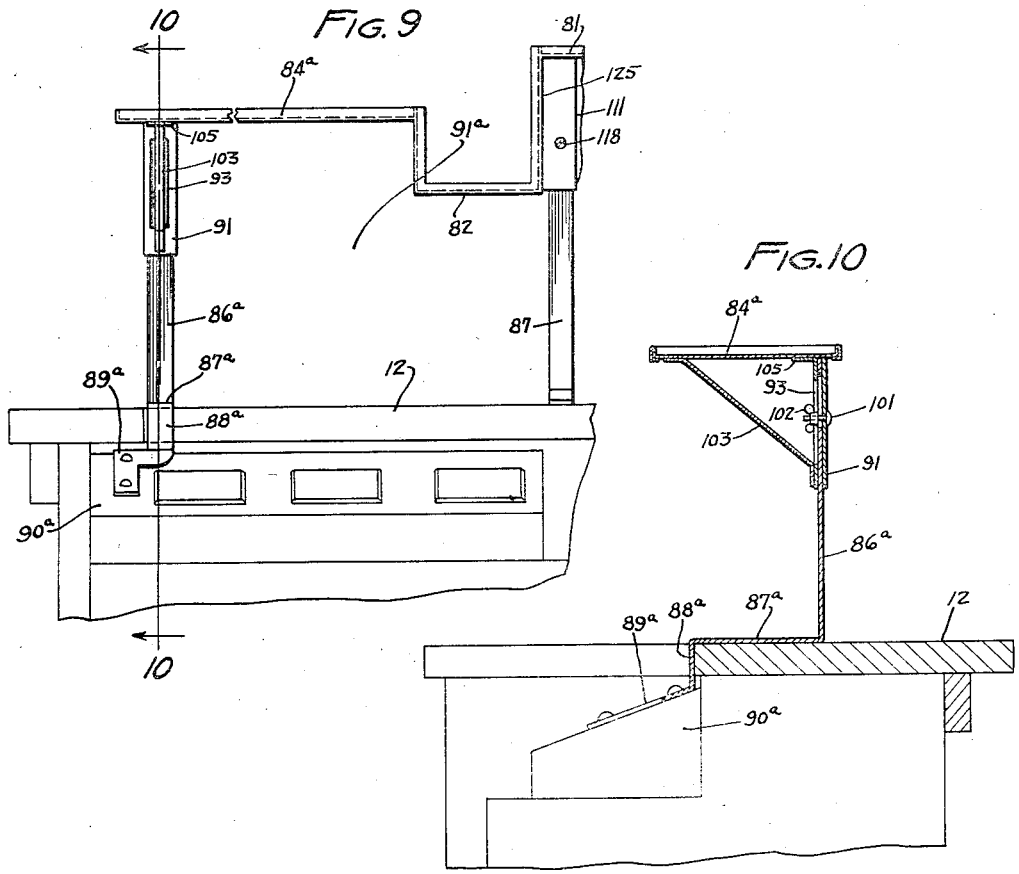
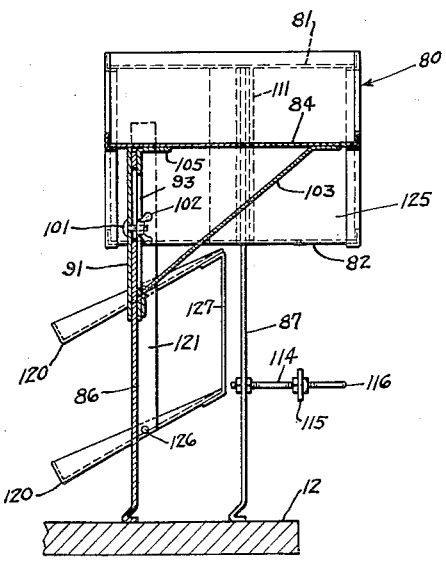
Inventor
HERBERT B. HYAMS
ATTORNEYS Patented Nov. 6, 1934

1,979,833

UNITED STATES PATENT OFFICE 1,979,833

MERCHANDISE DISPLAY DEVICE

Herbert B. Hyams, St. Paul, Minn.

Application January 11, 1932, Serial No. 585,883

7 Claims. (Cl. 211—1)

This invention relates generally to improvements in goods-display devices, and particularly to new use of such devices on a service counter in opposition to the draft arms of a soda fountain, between the draft arms and the customer.

One of the objects is to utilize, for display purposes, what is known as "waste space" directly in front of or in opposition to the draft arms. This space is so named because it is near the draft arms and includes about half of the transverse area of the counter, which is difficult of access by the server, because the draft arms are near the counter and extend a substantial distance thereabove. The present device overlies the "waste space", but leaves available sufficient space for use by the customer.

Features of the invention include the broad idea of the arrangement of a device of this character adjacent and in opposition to the draft arms; the attachment of such a device to the arms; means by which the display supports of the device can be vertically adjusted; the means by which the draft arm attachment means can be horizontally adjusted to bring the display device nearer to or farther away from the arms; the arrangement whereby displayed goods, or food or service receptacles, can be passed by the server beneath the goods-display device to the customer; the construction of the device to overhang the arms and to obtain a maximum of display area transversely of the counter and yet having the device occupy only a minimum of the transverse horizontal area of the counter, between the draft arms and the customer's side of the counter, leaving substantial service area for the customer, directly in front of the goods-display device; display shelves arranged laterally of the end-most draft arms, and spaced above the counter to allow goods to be passed therebeneath at a point laterally of the end-most draft arms but immediately there-adjacent; elongated laterally extending shelves and legs for supporting them and means by which the legs are connected with the counter structure at the inner side thereof and below the level of the counter; elongated lateral shelves which extend in opposite directions to the ends of the counter; and generally all details of construction shown, as well as all ideas of means inherent in the disclosure.

Objects, features and advantages of the invention will be set forth in the description of the drawings forming a part of this application, and in said drawings Figure 1 is a view from the front side of a soda water counter showing the display device positioned with reference to the draft arms;

Figure 5 is a view similar to Figure 1, but showing a modified form of the invention;

Figure 6 is a view of the modification generally corresponding to Figure 2;

Figure 7 is a bottom plan sectional view taken on line 7—7 of Figure 6, the draft arms being omitted;

Figure 8 is a vertical section taken on line 8—8 of Figure 6, the draft arms being omitted;

Figure 9 is an elevation taken from the server's side of the counter showing a modification; and Figure 10 is a vertical section taken on line 10—10 of Figure 9.

Figure 1:
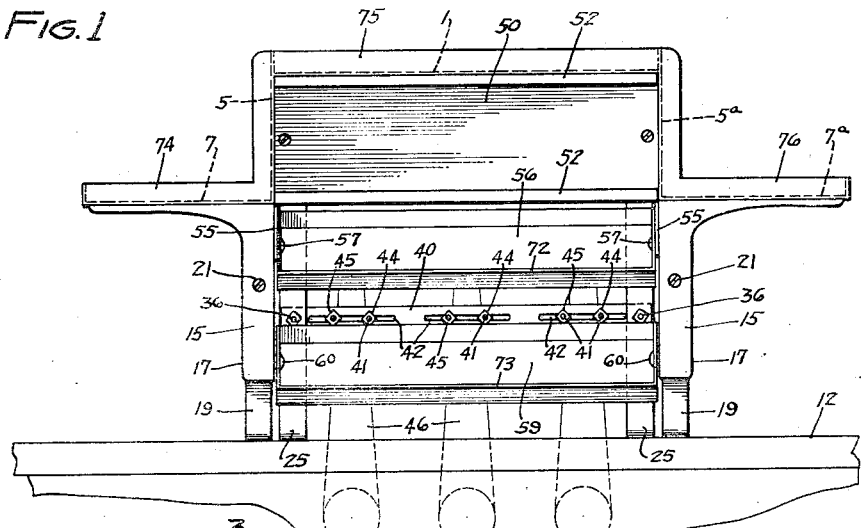
Figure 2:
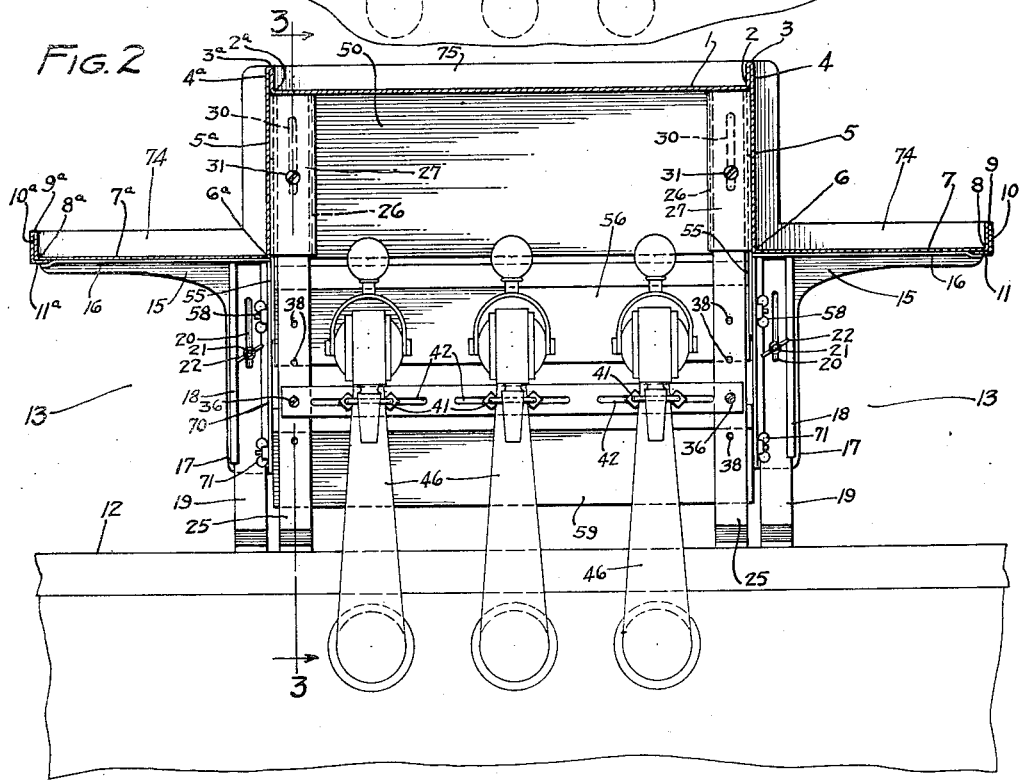
Figure 2 is a section taken substantially on line 2—2 of Figure 3 viewing the device from the rear side of the counter.
Figure 3:
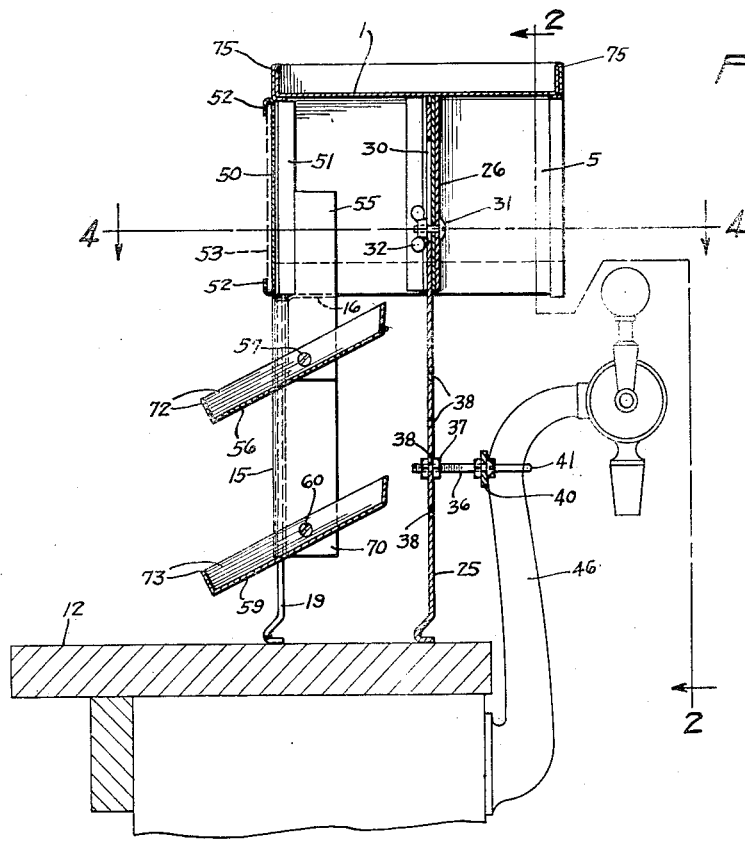
Figure 3 is a vertical section through the counter and device taken on line 3—3 of Figure 2.

Referring first to Figures 1 to 4 inclusive: the advertising display device is so proportioned as to utilize a minimum area of the counter which lies between the draft arms and the customer, which area is rather difficult of access by reaching over the draft arms, since the arms extend a substantial distance above the counter level, as well shown in Figure 3. The width of the device is such that when it is attached, there is a substantial service area between it and that edge of the counter nearest the customer. The transverse dimension of the top of the shelf or display device is materially increased by having the shelf overhang the draft arms. This top shelf display area is increased longitudinally by providing lateral shelves, see Figures 1 and 2, which are raised above the counter level, and under which goods to be served can be passed by the server to the customer. These shelves are extended laterally with respect to the draft arms.

The device of Figures 1 to 4 is constructed as follows, referring first to Figure 2: The top or main shelf is formed by bending a single piece of metal. First, a centrally disposed shelf portion 1 is provided at the highest level above the counter, then the metal is bent upwardly as at 2 and then downwardly as at 3 to provide a reinforced goods-retaining rim or flange 4, and to provide a downwardly extending vertical wall 5. The sheet is then bent horizontally as at 6 to provide the shelf 7 at a lower level, but spaced above the counter, to allow goods to be passed to the customer. The sheet is then upwardly bent as at 8, and then downwardly as at 9 to provide reinforced retaining flange 10, and then the metal is under-bent as at 11. Similar bends are made in the opposite direction from the opposite side of the portion 1, respectively at 2ª, 3ª, 4ª etc.

A feature of the invention is the extensions 7 and 7ª which overlie and are spaced upwardly from the top surface of the counter 12 to provide what may be termed service spaces, which are indicated 13. These spaces are adjacent the endmost draft arms.

Figure 4:
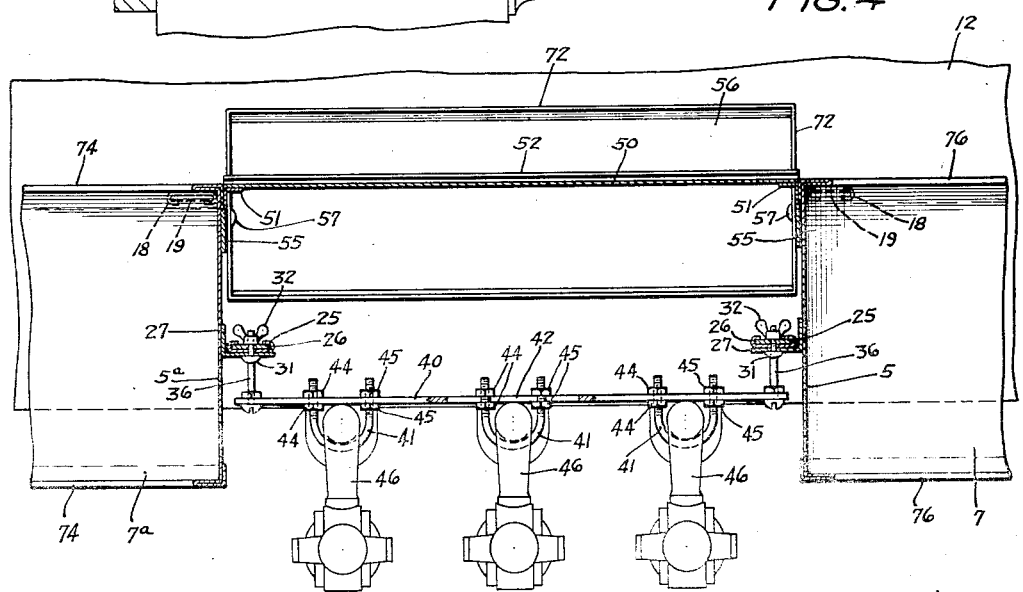
Figure 4 is a plan section taken on line 4—4 of Figure 3.

Attached beneath the shelf portions 7—7ª at the front edges thereof, are brackets generally designated 15. Each bracket has a horizontal flange 16 which is soldered or otherwise suitably attached to the under surface of the corresponding shelf 7, 7ª. Each bracket has a vertical portion 17 to the inside of which, see Figures 2 and 4, is attached a guide element 18. The top of the guide abuts the bottom of the corresponding shelf. Slidable within each guide is a leg 19 vertically slotted as at 20. A suitable bolt 21 passes through the bracket and guide, and through the slot 20, and thumb nut 22 is in threaded connection with the bolt as shown in Figure 2. The shelf can thus be vertically adjusted. No limitation is intended as to the degree of adjustment, and the shelf may be brought closer to the counter, if desired. In addition to the forwardly disposed legs 19, rear legs 25, two in number, are provided. Referring to Figures 3 and 4, these legs 25 are arranged in guides 26, which are soldered to the flanges of angle irons 27. These irons are respectively soldered to vertical walls 5—5ª of the shelf. These legs 25 are vertically slotted as at 30 and a bolt 31 traverses the iron guide and slot, and each has a thumb nut 32. The shelf is thus supported by four legs arranged as those of a table to prevent tipping of the display device.

In order that the display device may be held against movements longitudinally and transversely of the counter and draft arms (see Figure 3) means is provided for securing the device to the arms. One form of such means is shown as attached to the legs 25. Each leg 25 is provided with a bolt 36, which is threaded and has setnuts 37 for obtaining horizontal adjustment. each bolt traverses one of a series of vertically spaced openings 38. The bolts can thus be placed at different levels in correspondence to the heights of the draft arms, connected to and supported by the bolts 36, is a cross piece 40 longitudinally slotted as at 42, see Figure 2, the slots being aligned lengthwise of the strip. Arranged in each slot is a U-shaped clip 41 which encircles the vertical portion of the corresponding draft arm 46. Each clip is provided with pairs of nuts 44—45 in threaded engagement with the legs of the clips for obtaining adjustment and for setting the clips after adjustment to clamp the element 40 securely to the draft arm.

By means of the legs, the upper shelf can be vertically adjusted and by means of the clips 41, the device can be clamped to the draft arms against movement in either longitudinal or transverse directions. By means of the bolts 36 the device, as a whole, can be adjusted transversely with respect to the counter toward or away from the draft arms. These devices and structures for obtaining them are all features of the invention.

Another feature of the invention relates to the provision of a plate-like display card holder 50, see Figures 1 and 3, which acts as a closure for the front side of the arch formed by portions 1, 5 and 5ª. The plate is detachably secured to angle irons 51, see Figure 4, secured respectively to the vertical portions 5 and 5ª of the shelf, see also Figure 3. The holder has in-turned portions providing card-receiving grooves 52. The card is indicated in dotted lines at 53, see Figure 3.

Another feature of the invention is the provision of the goods-display shelves supported beneath the shelves, ordinarily beneath the central shelf 1. In this embodiment each shelf is supported by means which permits angular adjustment about a horizontal axis. One of the shelves 56 is supported by plates 55 secured respectively to the vertical portions 5—5ª of the shelf, see Figures 3 and 4. The shelf 56 is secured to these elements 55 by pivotal means 57 including bolt and a thumb nut 58, see Figure 2. A second shelf 59 is provided below the shelf 56 and this shelf is pivotally secured as at 60 to flanges 70 of brackets 15. This pivoting means also includes a thumb nut 71, see Figure 2. These shelves are provided with upstanding retaining flanges 72—73, and the upper shelf at its various levels is provided with lateral retaining flanges 74, 75, 76, these flanges being formed by re-bending as best shown in Figures 3 and 4.

In Figures 5, 6, 7 and 8, a modification has been shown in which the main display shelf herein generally designated 80, has the uppermost shelf portion 81, and the lateral shelf portions 82 corresponding to the shelf portions 7 and 7ª of the first described form. In addition, the form provides vertical portions 83, and horizontal goods-supporting portions 84. This shelf is formed from a single sheet of metal as in the first case. In this form of the device, the legs are somewhat differently disposed. The outer legs 86 are connected to the portions 84. The inner legs 87 are arranged adjacent the draft arms as in the first form. The arrangement is best shown in Figure 8.

As in the first case, the delivery space 90 is provided below the shelf. The legs 86 are slidable in tubular guides 91, having one side cut away as indicated at 93, see Figure 6. The legs are slotted and bolts 101 have wing nuts 102. A brace 103 connects the guide 91 with the under side of the shelf 84, and the elements 91 are brazed at their upper ends to this shelf. The upper ends of the tubular elements 91 are broadened by the extensions 105 to facilitate the attachment by brazing.

The legs 87 are adjustable in tubular elements 110 secured to angle iron brackets 111, see Figure 7. The legs 87 are provided with series of vertically spaced openings 112 (corresponding to the openings 38 of the legs 25, to receive the bolts 114 to which bolts are attached the cross piece 115. Clips indicated at 116 correspond to clips 41 and are similarly constructed and operable. The adjusting slots for the clips are indicated at 117. The legs 87 have adjusting and clamping means generally indicated at 118 in Figure 6. In this form, the auxiliary shelves 120 are non-adjustably attached to depending elements 121 secured as by welding to the vertical portions 125 of the shelf. The devices fastening the shelves to these depending arms 121 are indicated at 126. The shelves are connected at the back by strips 127.

In Figures 9 and 10 another modification is shown. The only essential difference between this and the form shown in Figures 5, 6, 7 and 8 is that the shelf 84ª extends to the end of the counter, and the leg 86ª has a foot 87ª, see Figure 10, engaging the counter and having a downturned portion 88ª, as a stop limiting outward motion of the leg. This is a feature. An additional feature is the extension 89ª for positively securing the leg to a block 90ª attached at the end of the counter at the inner side thereof. This provides a longer shelf, and a correspondingly longer passage 91ª through which material can be delivered beneath the shelf to the customers.

I claim as my invention:

1. A goods display structure adapted to be placed on a soda water fountain counter between the draft arms and the customers' side of the counter, comprising a shelf and four legs supporting the same, said legs being closely spaced in a direction transverse to the structure and counter to be as close as possible to the arms, the said shelf extending a substantial distance beyond the legs to overlie the draft arms and thus increase the transverse shelf area.

2. A goods display structure adapted to be placed on a soda water fountain counter between the draft arms and the customers' side of the counter, comprising a shelf and four legs supporting the same, said legs being closely spaced in a direction transverse to the structure and counter to be as close as possible to the arms, the said shelf extending a substantial distance beyond the legs to overlie the draft arms and thus increase the transverse shelf area in a direction toward the arms and means carried by the structure for attaching the device to the draft arms, to prevent toppling.

3. A goods display structure adapted to be placed on a soda water fountain counter between the draft arms and the customers' side of the counter, including legs closely spaced in direction transversely of the structure and counter, the transverse spacing of the legs being such that after placement there is exposed between said legs and the counter a substantial counter service area, said device having shelves supported by the legs, adjacent the customers' side, a portion of said structure being extended transversely beyond the legs to overlie the arms, and thus increase the transverse goods display area.

4. A goods display structure adapted to be placed on a soda water fountain counter between the draft arms and the customers' side of the counter, including legs, the transverse spacing of which is such that after placement there is exposed between said legs and the counter a substantial counter service area, said device having middle and lateral shelves, the legs being attached to the middle shelf, and said middle shelf being substantially extended transversely beyond the legs to overlie the arms and thus increase transverse shelf area.

5. A goods display structure adapted to be placed on a soda water fountain counter between the draft arms and the customers' side of the counter, said device having shelves which are disposed at different levels including shelves one at each opposite side of a middle shelf, said side shelves being so placed as to extend laterally of the draft arms in direction of the counter, and spaced to allow passage of food therebeneath to the customer, legs supporting the middle shelf, and said middle shelf being extended beyond the legs in a direction transverse thereto and to the counter to overlie the arms and thus increase the transverse shelf area.

6. A goods display structure adapted to be placed on a soda water fountain counter between the draft arms and the customers' side of the counter, said device having a shelf structure, legs supporting the shelf structure, said shelf being extended beyond the legs in a direction transverse thereto and to the counter to overlie the arms and thus increase the transverse shelf area, means attaching the legs to the shelf structure for raising and lowering the structure conformably to varying heights of draft arms, to permit overlie of the shelf relative to the arms.

7. A goods display structure adapted to be placed on a soda water fountain counter between the draft arms and the customers' side of the counter, said device having a shelf, legs supporting the shelf, said shelf being extended beyond the legs in a direction transverse thereto and to the counter to overlie the arms and thus increase the transverse shelf area, said legs being closely spaced transversely of the shelf and counter, a bar attached to two of the legs, and clips on the bars adapted to encircle the draft arms to prevent toppling of the structure.

HERBERT B. HYAMS.